(12) United States Patent
Kajiyama et al.

(10) Patent No.: US 11,038,432 B2
(45) Date of Patent: Jun. 15, 2021

(54) POWER CONVERSION DEVICE

(71) Applicant: Mitsubishi Electric Corporation, Chiyoda-ku (JP)

(72) Inventors: Takuya Kajiyama, Chiyoda-ku (JP); Takaharu Ishibashi, Chiyoda-ku (JP); Zhiqing Yang, Aachen (DE)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/616,007

(22) PCT Filed: Apr. 9, 2018

(86) PCT No.: PCT/JP2018/014881
§ 371 (c)(1),
(2) Date: Nov. 22, 2019

(87) PCT Pub. No.: WO2019/008854
PCT Pub. Date: Jan. 10, 2019

(65) Prior Publication Data
US 2020/0274457 A1 Aug. 27, 2020

(30) Foreign Application Priority Data
Jul. 4, 2017 (JP) .............................. JP2017-131017

(51) Int. Cl.
*H02M 3/335* (2006.01)
*H02M 1/08* (2006.01)
*H02M 1/00* (2006.01)

(52) U.S. Cl.
CPC ....... *H02M 3/33584* (2013.01); *H02M 1/083* (2013.01); *H02M 2001/0058* (2013.01);
(Continued)

(58) Field of Classification Search
CPC ......... H02M 2001/0058; H02M 1/083; H02M 2001/0074; H02M 2001/0077
See application file for complete search history.

(56) References Cited

U.S. PATENT DOCUMENTS

| | | | |
|---|---|---|---|
| 2014/0226369 A1 | 8/2014 | Kimura et al. | |
| 2015/0349649 A1* | 12/2015 | Zane | .................. H02M 1/4241 363/21.03 |

(Continued)

FOREIGN PATENT DOCUMENTS

| | | |
|---|---|---|
| JP | 2013-27201 A | 2/2013 |
| JP | 2013-251998 A | 12/2013 |

(Continued)

OTHER PUBLICATIONS

International Search Report dated May 15, 2018 in PCT/JP2018/014881 filed Apr. 9, 2018, 2 pages.

(Continued)

*Primary Examiner* — Thienvu V Tran
*Assistant Examiner* — Sisay G Tiku
(74) *Attorney, Agent, or Firm* — Xsensus LLP

(57) ABSTRACT

Provided is a power conversion device including a power converter for performing power conversion between primary-side DC voltage and secondary-side DC voltage, and a control device for controlling the power converter in accordance with a command value, wherein the control device generates a primary-side duty for a primary-side bridge circuit, a secondary-side duty for a secondary-side bridge circuit, and a phase shift amount between the primary-side bridge circuit and the secondary-side bridge circuit, on the basis of a solution of an optimization problem for minimizing a peak absolute value of current flowing through the transformer, under a constraint condition that zero voltage switching operation is achieved, at an operation point based on the command value, thus achieving zero voltage
(Continued)

switching operation and suppressing increase in conduction loss, without increase in the number of components.

17 Claims, 11 Drawing Sheets

(52) U.S. Cl.
CPC ............... *H02M 2001/0074* (2013.01); *H02M 2001/0077* (2013.01)

(56) References Cited

U.S. PATENT DOCUMENTS

| | | | |
|---|---|---|---|
| 2018/0054136 A1* | 2/2018 | Jimichi | H02M 1/08 |
| 2020/0007022 A1* | 1/2020 | De Doncker | H02M 1/083 |
| 2020/0389095 A1* | 12/2020 | Kajiyama | H02M 3/33576 |

FOREIGN PATENT DOCUMENTS

| | | |
|---|---|---|
| JP | 2014-180192 A | 9/2014 |
| JP | 2015-65755 A | 4/2015 |
| JP | 2016-12969 A | 1/2016 |
| JP | 2016-12970 A | 1/2016 |
| JP | 2017-85785 A | 5/2017 |
| JP | 2017-99163 A | 6/2017 |

OTHER PUBLICATIONS

Japanese office action dated Feb. 1, 2019 of the corresponding Japanese patent application No. 2018-538788.
De Doncker, R.W. et al., "The Auxiliary Resonant Commutated Pole Converter," Conference Record of the 1990 IEEE Industry Applications Society Annual Meeting, vol. 2, pp. 1228-1235.
Hamid Daneshpajooh et al."Modified Dual Active Bridge Bidirectional dc-dc Converter with Optimal Efficiency", Applied Power Electonics Conference and Exposition (APEC), 2012 Twenty-Seventh Annual IEEE, IEEE, Feb. 5, 2012, pp. 1348-1354, XP032127844.
Extended European search report dated Mar. 4, 2021 of the corresponding European patent application No. EP18828276.8.

* cited by examiner

FIG. 6
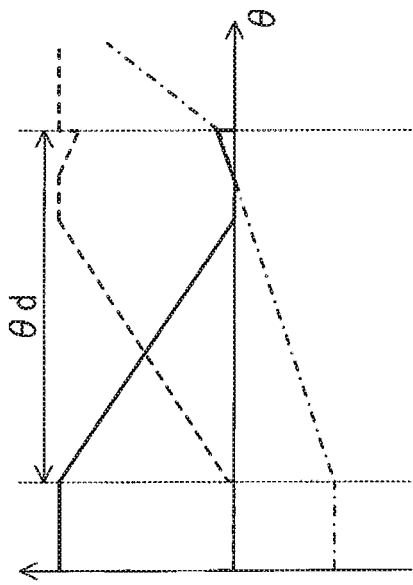
FIG. 6A
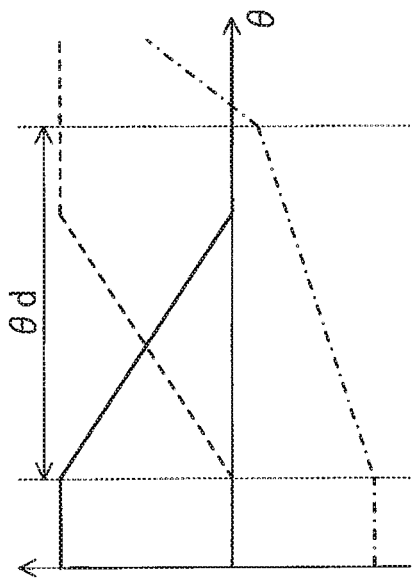
FIG. 6B
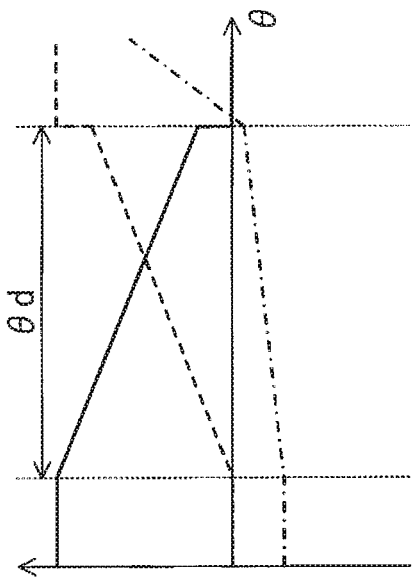
FIG. 6C

POWER CONVERSION DEVICE

TECHNICAL FIELD

The present disclosure relates to a power conversion device that performs power conversion between DC voltages, and in particular, relates to technology for reducing generated loss therein.

BACKGROUND ART

For example, in photovoltaic power generation equipment, a storage battery system, and the like, a DC/DC converter that can perform bidirectional interchange of DC power is applied. In particular, a DC/DC converter of dual active bridge (DAB) type has such a simple structure in which AC-side terminals of full-bridge inverters are connected via a transformer, and has a symmetric circuit configuration so as to have equal characteristics between power transmissions in both directions, and, owing to such features, the DAB-type DC/DC converter is used for various cases.

It is known that the DAB-type DC/DC converter uses a resonance phenomenon between a leakage inductance of the transformer and a snubber capacitor connected in parallel to a switching element, whereby, without adding a special circuit or performing special control, soft switching operation, in particular, zero voltage switching operation (ZVS) is achieved so as not to cause switching loss.

However, under a specific condition such as a light load condition in which transformer current is small or a case where input and output voltages are greatly different from each other, there is a possibility that soft switching operation cannot be achieved and thus the switching operation becomes hard switching.

Regarding such a technical problem, several methods have been proposed. For example, in Non-Patent Literature 1, an auxiliary circuit for causing resonance is provided, and commutation is performed using the auxiliary circuit, so as to expand an operation region in which soft switching operation can be performed.

In addition, for example, in Patent Literature 1, the duties of a full-bridge inverter on a primary side and a full-bridge inverter on a secondary side, and a phase difference between the inverters, are adjusted so as to expand an operation region in which soft switching operation can be performed.

CITATION LIST

Patent Document

Patent Document 1: Japanese Laid-Open Patent Publication No. 2016/12969

Non-Patent Document

Non-Patent Document 1: R. W. De Doncker and J. P. Lyons, "The Auxiliary Resonant Commutated Pole Converter" Conference Record of the 1990 IEEE Industry Applications Society Annual Meeting, vol. 2, pp. 1228-1235, (1990)

SUMMARY OF THE INVENTION

Problems to be Solved by the Invention

However, in the device disclosed in Non-Patent Literature 1 described above, the auxiliary circuit shown in this literature is needed in addition to the original components of the DC/DC converter, thus causing a problem that the number of components increases.

In general, there is a correlation between peak current flowing through a switching element and a transformer, and the duties of inverters and a phase difference between the inverters. However, this is not taken into consideration in the device disclosed in Patent Literature 1 described above. Therefore, depending on the conditions, the peak current might increase, leading to increase in conduction loss.

The present disclosure has been made to solve the above problems, and an object of the present disclosure is to provide a power conversion device that can achieve zero voltage switching operation and suppress increase in conduction loss, without increase in the number of components.

Solution to the Problems

A power conversion device according to the present disclosure includes a power converter for performing power conversion between primary-side DC voltage and secondary-side DC voltage, and a control device for controlling the power converter in accordance with a command value. The power converter includes: a primary-side bridge circuit which includes a switching element and a snubber capacitor connected in parallel to the switching element, and which is connected between a primary-side DC terminal and a primary-side AC terminal, the primary-side bridge circuit being configured to perform DC/AC conversion; and a secondary-side bridge circuit which includes a switching element and a snubber capacitor connected in parallel to the switching element, and which is connected between a secondary-side DC terminal and a secondary-side AC terminal connected to the primary-side AC terminal via an inductance element, the secondary-side bridge circuit being configured to perform AC/DC conversion. The power converter is configured so as to allow zero voltage switching operation using a resonance phenomenon between each snubber capacitor and the inductance element. The control device generates a primary-side duty for the primary-side bridge circuit, a secondary-side duty for the secondary-side bridge circuit, and a phase shift amount between the primary-side bridge circuit and the secondary-side bridge circuit, so as to minimize loss in the power converter, under a condition that the zero voltage switching operation is achieved, at an operation point based on the command value.

Effect of the Invention

The power conversion device according to the present disclosure is configured to generate the primary-side duty, the secondary-side duty, and the phase shift amount so as to minimize loss in the power converter under the condition that zero voltage switching operation is achieved, as described above. Therefore, without increase in the number of components, zero voltage switching operation is achieved so that switching loss does not occur, and increase in conduction loss can be suppressed.

BRIEF DESCRIPTION OF THE DRAWINGS

FIGS. 6A, 6B, and 6C illustrate zero voltage switching operation and shows waveforms of voltage vcp1 between both terminals of the semiconductor switching element 1p1, voltage vcn1 between both terminals of a semiconductor switching element 1n1, and primary-side current itr1 of the transformer 2, at a switching timing α.

DESCRIPTION OF EMBODIMENTS

Embodiment 1

Figure 1:
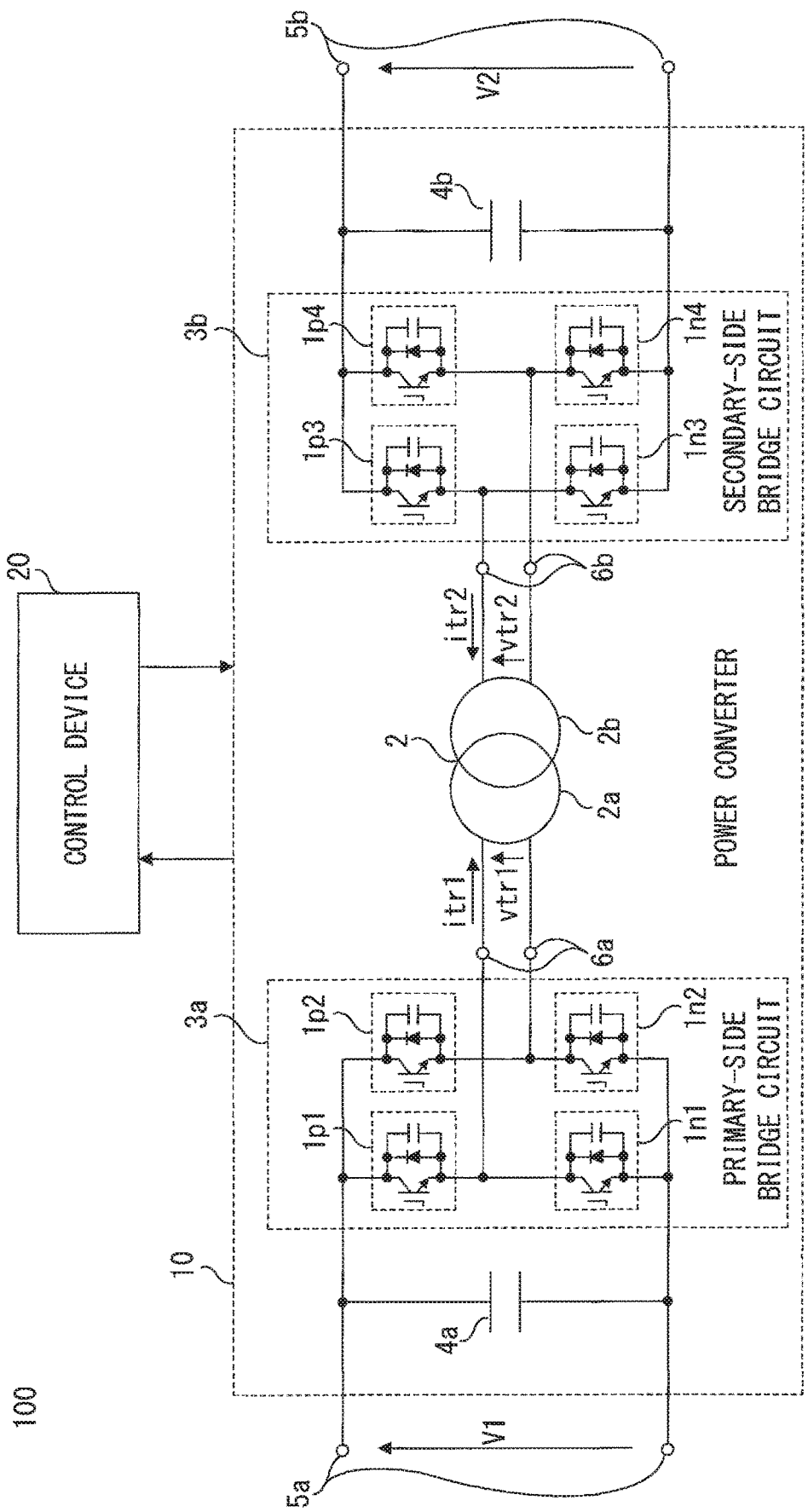
FIG. 1 is a diagram showing the configuration of a power conversion device 100 according to embodiment 1.

FIG. 1 shows the configuration of a power conversion device 100 according to embodiment 1. The power conversion device 100 in FIG. 1 includes, as a whole, a power converter 10 which performs power conversion between primary-side DC voltage V1 and secondary-side DC voltage V2, and a control device 20 which controls the power converter 10.

The power converter 10 is a DAB-type DC/DC converter, and here, includes a primary-side bridge circuit 3a, a secondary-side bridge circuit 3b, and a transformer 2. The primary-side bridge circuit 3a includes a series connection body formed by semiconductor switching elements 1p1 and 1n1 and a series connection body formed by semiconductor switching elements 1p2 and 1n2, the series connection bodies being connected to primary-side DC terminals 5a to which primary-side DC voltage V1 is applied.

An intermediate point between the semiconductor switching elements 1p1 and 1n1 and an intermediate point between the semiconductor switching elements 1p2 and 1n2 are connected to a primary-side winding 2a of the transformer 2 via primary-side AC terminals 6a of the primary-side bridge circuit 3a.

Similarly, the secondary-side bridge circuit 3b includes a series connection body formed by semiconductor switching elements 1p3 and 1n3 and a series connection body formed by semiconductor switching elements 1p4 and 1n4, the series connection bodies being connected to secondary-side DC terminals 5b to which secondary-side DC voltage V2 is applied.

An intermediate point between the semiconductor switching elements 1p3 and 1n3 and an intermediate point between the semiconductor switching elements 1p4 and 1n4 are connected to a secondary-side winding 2b of the transformer 2 via secondary-side AC terminals 6b of the secondary-side bridge circuit 3b.

Capacitors 4a and 4b are connected to the primary-side DC terminals 5a and the secondary-side DC terminals 5b, so as to stabilize the DC voltages of the respective terminals.

The power conversion device 100 in FIG. 1 can optionally perform power conversion between the primary side and the secondary side, and can optionally control the transmission direction of the power.

Figure 2:
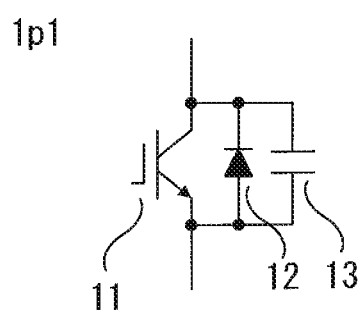
FIG. 2 is a diagram showing the internal configuration of a semiconductor switching element 1p1 shown in FIG. 1, as an example.

FIG. 2 shows the internal configuration of a semiconductor switching element 1p1 shown in FIG. 1, as an example. The semiconductor switching element 1p1 is configured such that a diode (freewheeling diode (FWD)) 12 is connected in antiparallel to a self-turn-off switching element 11 such as an insulated gate bipolar transistor (IGBT) or a gate commutated turn-off (GCT) thyristor, and a snubber capacitor 13 is further connected in parallel thereto.

With the above configuration, the power converter 10 converts DC power inputted from the primary-side DC terminals 5a, to single-phase or multiple-phase AC, here, single-phase AC, by the primary-side bridge circuit 3a, transmits the converted power to the secondary-side bridge circuit 3b via the transformer 2, converts the transmitted power to DC again by the secondary-side bridge circuit 3b, and transmits the converted power to the secondary-side DC terminal 5b.

In addition, owing to symmetry of the circuit, in the case where DC power is inputted from the secondary-side DC terminals 5b, the DC power is converted to single-phase AC by the secondary-side bridge circuit 3b, the converted power is transmitted to the primary-side bridge circuit 3a via the transformer 2, the transmitted power is converted to DC again by the primary-side bridge circuit 3a, and the converted power is transmitted to the primary-side DC terminal 5a.

Figure 3:
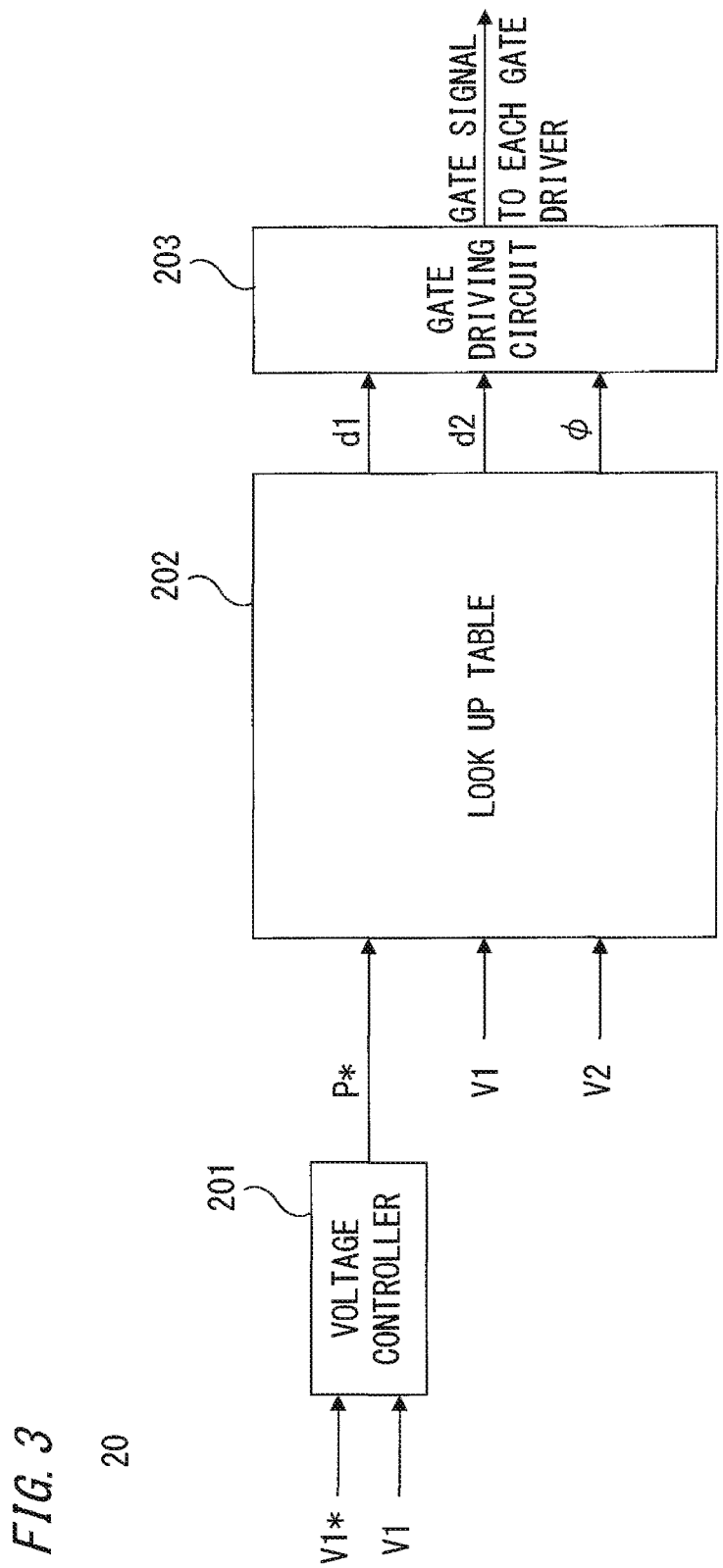
FIG. 3 is a diagram showing the internal configuration of a control device 20 shown in FIG. 1.

FIG. 3 shows the internal configuration of the control device 20 shown in FIG. 1. In FIG. 3, the case of controlling the power converter 10 so that a primary-side DC voltage detection value (hereinafter, may be abbreviated as primary-side DC voltage) V1 follows a command value, i.e., a primary-side DC voltage command value V1*, will be described.

A voltage controller 201 receives the primary-side DC voltage command value V1* given from a superior section in the control system, and the primary-side DC voltage V1 from a voltage detector (not shown), and outputs a transmission power command value P* so that the primary-side DC voltage V1 follows the primary-side DC voltage command value V1*. Here, the secondary-side DC voltage V2 is kept at a constant value by a device (not shown) connected to the secondary-side DC terminals 5b, for example.

Further, a look up table 202 is provided which receives the transmission power command value P* from the voltage controller 201, the primary-side DC voltage V1, and the secondary-side DC voltage V2, and outputs a primary-side duty d1 which is a conduction ratio for the semiconductor switching element 1p1, etc. of the primary-side bridge circuit 3a, a secondary-side duty d2 which is a conduction ratio for the semiconductor switching element 1p3, etc. of the secondary-side bridge circuit 3b, and a phase shift amount φ between the primary-side bridge circuit 3a and the secondary-side bridge circuit 3b.

The manner for calculating the primary-side duty d1, the secondary-side duty d2, and the phase shift amount φ from the transmission power command value P*, the primary-side DC voltage V1, and the secondary-side DC voltage V2, which are information to be stored in the look up table 202, will be described later in detail.

A gate driving circuit 203 receives the primary-side duty d1, the secondary-side duty d2, and the phase shift amount φ from the look up table 202, generates gate signals for ON/OFF driving the semiconductor switching elements 1p1 to 1n4, and sends them to respective gate drives.

The function of the gate driving circuit 203 may be incorporated into the look up table 202, and the gate signals may be sent to the gate drives directly from the look up table 202.

The above three values, i.e., the transmission power command value P*, the primary-side DC voltage V1, and the secondary-side DC voltage V2 are an example of a condition for specifying the circuit operation state of the power converter 10, and here, are referred to as an operation point set on the basis of the command value V1*.

Thus, the operation point is a condition for specifying the circuit operation state of the power converter 10. Therefore, for example, the transmission power command value P* calculated so that the secondary-side DC voltage V2 follows the secondary-side DC voltage command value V2*, the primary-side DC voltage V1 (constant value), and the secondary-side DC voltage V2 may be set as the operation point. The transmission power command value P* may be given by another method, or a detection value may be used instead of a command value. Further, a value obtained by combining a current command value and a voltage command value as appropriate may be set as the operation point.

Next, the manner for calculating the primary-side duty d1, the secondary-side duty d2, and the phase shift amount φ from the transmission power command value P*, the primary-side DC voltage V1, and the secondary-side DC voltage V2, which are information to be stored in the look up table 202, will be described.

Figure 4:
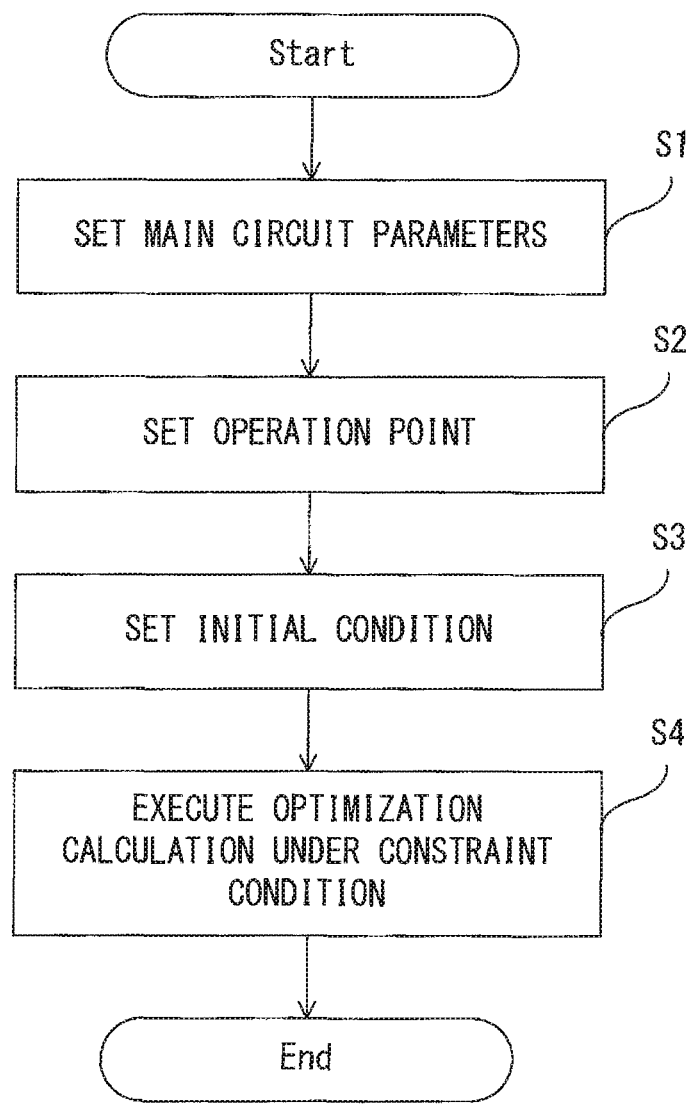
FIG. 4 is a flowchart showing a process for calculating data to be stored in the look up table 202 shown in FIG. 3.

FIG. 4 is a flowchart illustrating a process of this calculation. In the principle of this calculation method, solution of a so-called optimization problem for calculating an optimum value under a certain constraint condition is used.

Specific solution of the optimization problem is shown in detail in various documents. Therefore, in FIG. 4, contents to be set in the case of applying this in the present disclosure will be briefly described.

Step S1 is a step for setting main circuit parameters needed for calculating a main circuit operation of the power converter 10. Specifically, examples of the parameters are a capacitance Cs of the snubber capacitor 13, a leakage inductance Lσ of the transformer 2, a dead time td and a switching frequency f for each bridge circuit 3a, 3b, a turns ratio Ntr of the transformer 2, and the like, and these parameters are set in step S1.

Step S2 is a step for setting the operation point. Here, the transmission power command value P*, the primary-side DC voltage V1, and the secondary-side DC voltage V2 are set as described above.

Step S3 is a step for setting initial values of the primary-side duty d1, the secondary-side duty d2, and the phase shift amount φ which are a solution of the optimization problem, in order to calculate these.

Step S4 is a step for executing optimization calculation under a constraint condition with setting made in steps S1 to S3 above. Specifically, here, under a constraint condition of achieving zero voltage switching operation, an optimization calculation is executed to calculate the primary-side duty d1, the secondary-side duty d2, and the phase shift amount φ that minimize the peak absolute value of current flowing through the transformer 2.

While a specific mathematical method for solving the optimization problem is not particularly limited, hereinafter, a specific example of a constraint conditional expression for achieving zero voltage switching operation and a specific example of an evaluation function corresponding to the calculation for minimizing the peak absolute value of current flowing through the transformer 2, will be described.

First, an example of operation of the power converter 10 needed for considering the constraint conditional expression and the evaluation function will be described with reference to FIG. 5.

Figure 5:
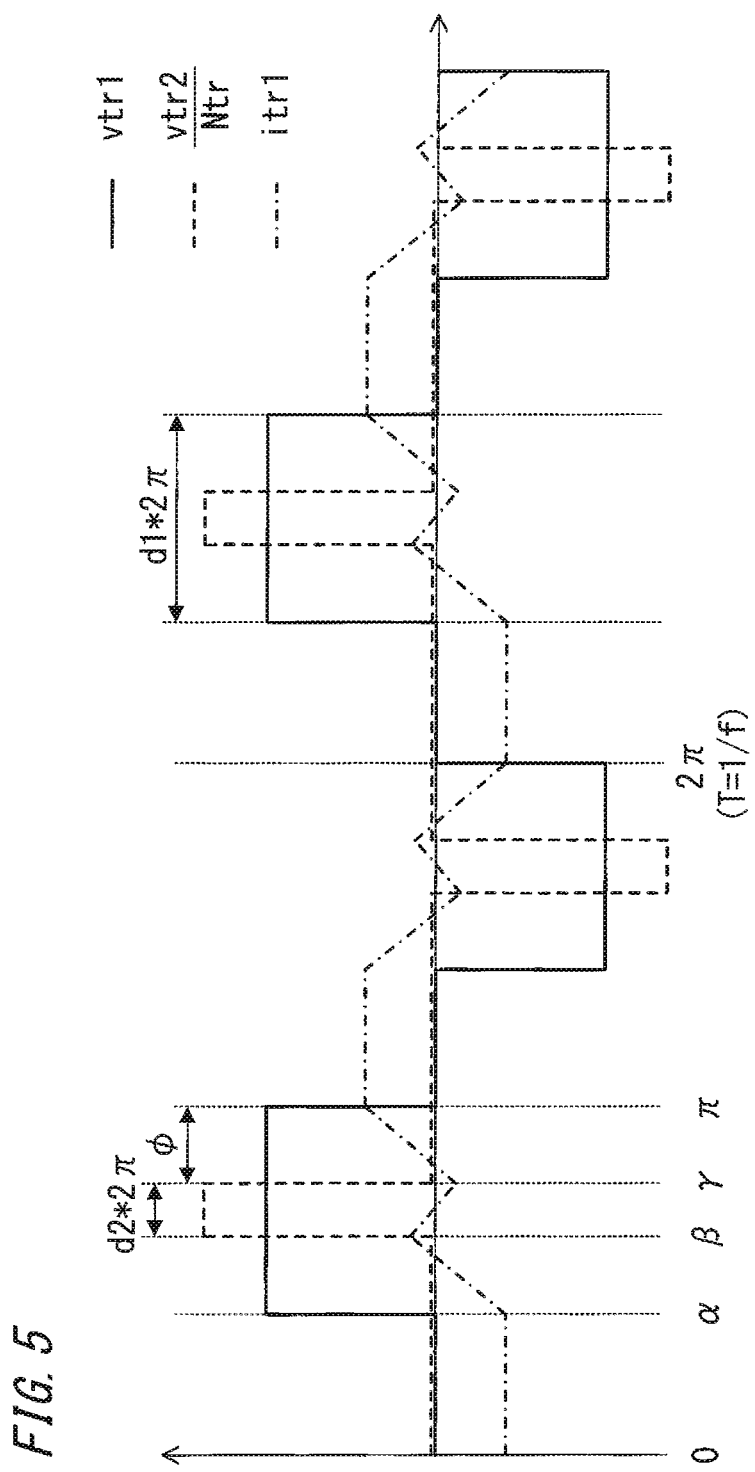
FIG. 5 illustrates the principle of operation according to the present disclosure and shows waveforms of primary-side voltage vtr1 of a transformer 2, primary-side converted value vtr2/Ntr of secondary-side voltage, and primary-side current itr1.

FIG. 5 shows waveforms of primary-side voltage vtr1 (indicated by solid line) which is voltage of the primary-side winding 2a of the transformer 2, a secondary-side voltage primary-side converted value vtr2/Ntr (indicated by broken line) which is a value obtained by dividing secondary-side voltage vtr2 which is voltage of the secondary-side winding 2b by the turns ratio Ntr of the transformer 2, and primary-side current itr1 (indicated by dotted-dashed line) flowing through the primary-side winding 2a of the transformer 2. Here, the turns ratio Ntr is represented as Ntr=N2/N1, where N1 is the number of turns of the primary-side winding 2a of the transformer 2, and N2 is the number of turns of the secondary-side winding 2b.

FIG. 5 shows a range over a period of 2T, where T (=1/f) is a switching cycle, but, since the control is symmetric between positive and negative, switching timings θ to be considered are four points, i.e., θ=0 (2π), α, β, γ, which are shown in only a half cycle.

Therefore, the relationship between the switching timings θ=0, α, β, γ, and the primary-side duty d1, the secondary-side duty d2, and the phase shift amount φ, is as shown in FIG. 5.

[Mathematical 1]

$$i_{tr1}(0 + \theta_d) \leq 0 \quad (1)$$

$$i_{tr1}(\alpha + \theta_d) \leq 0 \quad (2)$$

$$i_{tr1}(\beta + \theta_d) \geq 0 \quad (3)$$

$$i_{tr1}(\gamma + \theta_d) \leq 0 \quad (4)$$

$$\frac{1}{2\pi f}\int_0^{\theta_d} -\frac{1}{2}i_{tr1}(\theta)d\theta \geq C_s V_1 \quad (5)$$

$$\frac{1}{2\pi f}\int_\alpha^{\alpha+\theta_d} -\frac{1}{2}i_{tr1}(\theta)d\theta \geq C_s V_1 \quad (6)$$

$$\frac{1}{2\pi f}\int_\beta^{\beta+\theta_d} \frac{1}{2}\frac{i_{tr1}(\theta)}{N_{tr}}d\theta \geq C_s V_2 \quad (7)$$

$$\frac{1}{2\pi f}\int_\gamma^{\gamma+\theta_d} -\frac{1}{2}\frac{i_{tr1}(\theta)}{N_{tr}}d\theta \geq C_s V_2 \quad (8)$$

Expressions (1) to (8) represent a constraint condition set in the optimization calculation, i.e., an operation condition for achieving zero voltage switching operation.

Next, with reference to FIGS. 6A, 6B, and 6C, whether or not zero voltage switching operation can be achieved will be described, and together with this, grounds for deriving the respective expressions representing the constraint condition will be described.

FIGS. 6A, 6B, and 6C show waveforms of voltage vcp1 (indicated by solid line) between both terminals of the semiconductor switching element 1p1, voltage vcn1 (indicated by broken line) between both terminals of the semiconductor switching element 1n1, and primary-side current itr1 (indicated by dotted-dashed line) of the transformer 2, at the switching timing θ=α in FIG. 5.

Here, θd is a phase amount corresponding to the dead time td which is set so as to prevent the primary-side DC terminals 5a, 5b from being short-circuited by the semiconductor switching elements 1p1 and 1n1 being turned on at the same time due to control error of the switching timings or the like, for example, and which is a period in which the two elements are both turned off, and the phase amount is represented as θd=2πf×td.

It is noted that, hereinafter, for convenience sake, θd as well as td may be referred to as dead time unless there is any problem. In FIGS. 6A, 6B, and 6C, the time axis is shown in an enlarged manner so as to clarify transitions of voltage and current in each graph.

FIG. 6A shows an example of a switching operation waveform in the case where zero voltage switching operation is achieved. As shown in FIG. 6A, in the case where zero voltage switching operation is achieved, after the semiconductor switching element 1n1 is turned off, transfer of accumulated energy from the snubber capacitor 13 of the semiconductor switching element 1n1 to the snubber capacitor 13 of the semiconductor switching element 1p1 is completed within the dead time θd, and the direction of the current is not inverted during the dead time θd.

On the other hand, FIG. 6B shows an example of a switching operation waveform in the case where zero voltage switching operation is not achieved. As shown in FIG. 6B, even after transfer of accumulated energy from the snubber capacitor 13 of the semiconductor switching element 1n1 to the snubber capacitor 13 of the semiconductor switching element 1p1 is completed within the dead time θd, when the direction of the current is inverted during the dead time θd, reverse flow of energy occurs between the snubber capacitors 13 of the switching elements, and thus, at the time when the semiconductor switching element 1p1 is turned on, the voltage between both terminals of each switching element has a significant value. Therefore, zero voltage switching operation cannot be achieved.

Expressions (1) to (4) prescribe a constraint condition for preventing inversion of the direction of current even in the case of considering phase delay corresponding to the dead time θd from each switching timing, so that the switching operation as shown in FIG. 6B will not be performed.

That is, Expression (1) prescribes that, in the case where the output voltage vtr1 (=negative value) of the primary-side bridge circuit 3a becomes 0, the direction of the current itr1 (=negative value) at θ=0 is not inverted at θ=0+θd.

Expression (2) prescribes that, in the case where the output voltage vtr1 (=0) of the primary-side bridge circuit 3a becomes vtr1 (=positive value), the direction of the current itr1 (negative value) at θ=α is not inverted at θ=α+θd.

Expression (3) prescribes that, in the case where the output voltage (=0) of the secondary-side bridge circuit 3b becomes vtr2/Ntr (=positive value), the direction of the current itr1 (=positive value) at θ=β is not inverted at θ=β+θd.

Expression (4) prescribes that, in the case where the output voltage vtr2/Ntr (=positive value) of the secondary-side bridge circuit 3b becomes 0, the direction of the current itr1 (=negative value) at θ=γ is not inverted at θ=γ+θd.

Next, FIG. 6C shows another example of a switching operation waveform in the case where zero voltage switching operation is not achieved. As shown in FIG. 6C, in the case where transfer of accumulated energy from the snubber capacitor 13 of the semiconductor switching element 1n1 to the snubber capacitor 13 of the semiconductor switching element 1p1 is not completed within the dead time θd, the voltage between both terminals of each switching element has a significant value at the time when the semiconductor switching element 1p1 is turned on, irrespective of whether or not the direction of the current is inverted. Therefore, zero voltage switching operation cannot be achieved.

Expressions (5) to (8) prescribe a constraint condition for causing electric charge transferred during the dead time θd to be equal to or greater than electric charge accumulated in the snubber capacitor 13, so that the switching operation as shown in FIG. 6C will not be performed.

Among these, Expressions (5) and (6) prescribe completion of transfer of accumulated energy between the snubber capacitors, at θ=0 and θ=α in the primary-side bridge circuit 3a.

Expressions (7) and (8) prescribe completion of transfer of accumulated energy between the snubber capacitors, at θ=β and f=γ in the secondary-side bridge circuit 3b.

[Mathematical 2]

$$g(d_1, d_2, \phi) = |i_{tr1}(0)| + |i_{tr1}(\alpha)| + |i_{tr1}(\beta)| + |i_{tr1}(\gamma)| \quad (9)$$

Expression (9) represents an evaluation function corresponding to a target in the optimization calculation. The right-hand side thereof represents addition of the absolute values of the primary-side current itr1 of the transformer 2 at the respective switching timings, for a half cycle. In the DAB-type DC/DC converter, the absolute value of the current itr1 becomes a peak (local maximum) at each switching timing. Therefore, using Expression (9) as an evaluation function, optimization calculation is performed so as to minimize the evaluation function, whereby a combination of the primary-side duty d1, the secondary-side duty d2, and the phase shift amount φ that minimize the peak current is calculated, and thus conduction loss occurring in the power converter 10 can be minimized.

It is noted that, although the constraint condition represented by Expressions (1) to (8) and the evaluation function represented by Expression (9) are used here as an example, the constraint condition may be changed as appropriate in accordance with the designing condition or the like of the power converter 10, for example.

In addition, also for the evaluation function, for example, only |itr1(0)| which contributes to conduction loss most greatly may be used as the evaluation function, or the evaluation function in which weighting is made on the basis of the degree of contribution to loss may be used. Thus, the evaluation function may be changed in accordance with the designing directions.

The above optimization calculation is performed for various operation points, thereby completing the look up table 202 in which each operation point is associated with the primary-side duty d1, the secondary-side duty d2, and the phase shift amount φ.

As described above, the power conversion device 100 according to the present embodiment 1 is provided with the look up table that stores information about the primary-side duty d1, the secondary-side duty d2, and the phase shift amount φ which correspond to an operation point composed of the transmission power command value P*, the primary-side DC voltage V1, and the secondary-side DC voltage V2, and which are obtained as a solution of the optimization problem for minimizing the absolute value of current itr1 indicated in the evaluation function of, for example, Expression (9), under a constraint condition prescribed by voltage and current ranges represented by, for example, Expressions (1) to (8), for achieving zero voltage switching operation.

Therefore, zero voltage switching operation is achieved so that switching loss does not occur, and the absolute value of current is minimized, whereby increase in conduction loss can be prevented.

Here, the operation example in the case of V1<V2/Ntr has been shown. However, owing to symmetry of the circuit, the case of V1>V2/Ntr can be treated with the primary side and the secondary side inverted from each other. The same applies in the subsequent embodiments.

Embodiment 2

The above embodiment 1 has been described on the premise that a combination of the primary-side duty d1, the secondary-side duty d2, and the phase shift amount φ which are a solution for minimizing the current can be obtained, under the above constraint condition, with respect to an operation point that can be assumed. However, it is also conceivable that such a solution cannot be obtained, depending on conditions such as actual main circuit parameters.

In the power conversion device according to the present embodiment 2, the above case is assumed and means for expanding the operation region in which zero voltage switching operation can be achieved is provided.

With reference to FIG. 5, change in current from the switching timing θ=β to the switching timing θ=γ is determined by a voltage difference between the primary-side DC voltage V1 and the primary-side converted value V2/Ntr of the secondary-side DC voltage, and the leakage inductance Lσ of the transformer 2, as shown in the following Expression (10).

[Mathematical 3]

$$i_{tr1}(\gamma) - i_{tr1}(\beta) = \frac{1}{L_\sigma} \times \left(V_1 - \frac{V_2}{N_{tr}}\right) \times d_2 \times T \quad (10)$$

From the above Expression (10), it can be confirmed that the primary-side DC voltage V1 influences the temporal change rate of current from the switching timing θ=β to the switching timing θ=γ. Therefore, by changing the primary-side DC voltage V1, it is possible to change the current value at the switching timing, without changing the duty. Thus, the constraint condition represented by Expressions (1) to (8) is substantially relaxed and a combination of the primary-side duty d1, the secondary-side duty d2, and the phase shift amount φ is expected to be newly obtained.

In addition, power is transmitted only when the secondary-side bridge circuit 3b is outputting voltage. Therefore, power P transmitted to the secondary-side bridge circuit 3b is determined by power transmitted from the switching timing θ=β to the switching timing θ=γ, and is represented by the following Expression (11).

[Mathematical 4]

$$U = \frac{T}{2} \times P = \frac{1}{2}(i_{tr1}(\beta) - i_{tr1}(\gamma)) \times \frac{V_2}{N_{tr}} \times \left(d_2 \times T - \frac{2 \times L_\sigma \times i_{tr1}(\gamma)}{V_1 - \frac{V_2}{N_{tr}}}\right) = \quad (11)$$

$$\frac{1}{2}\left(\frac{1}{L_\sigma}\left(\frac{V_2}{N_{tr}} - V_1\right) \times d_2 \times T\right) \times \frac{V_2}{N_{tr}} \times \left(d_2 \times T + \frac{2 \times L_\sigma \times i_{tr1}(\gamma)}{\frac{V_2}{N_{tr}} - V_1}\right) =$$

$$\frac{1}{2L_\sigma}\left(\frac{V_2}{N_{tr}} - V_1\right) \times \frac{V_2}{N_{tr}} \times d_2 \times T \times \left(d_2 \times T + \frac{2 \times L_\sigma \times i_{tr1}(\gamma)}{\frac{V_2}{N_{tr}} - V_1}\right)$$

From Expression (11), it is confirmed that, in the case where the transmission power P is constant, the secondary-side duty d2 can be changed by changing the primary-side DC voltage V1 with the secondary-side DC voltage V2 and the current itr1(γ) set to be constant. This can also practically correspond to an effect of relaxing the constraint condition.

That is, even in the case where the transmission power P is constant, by changing the primary-side DC voltage V1, the constraint condition can be relaxed, and zero voltage switching operation can be achieved in a wider operation region.

In the above description, in the case where the primary-side DC voltage V1 can be changed, the operation region in which zero voltage switching operation can be achieved is expanded by changing the primary-side DC voltage V1 from its original value. Besides, in the case where the secondary-side DC voltage V2 can be changed, zero voltage switching operation can be achieved in a wider operation region by changing the secondary-side DC voltage, and in the case where both voltages V1 and V2 can be changed, zero voltage switching operation can be achieved in a wider operation region by changing both voltages V1 and V2.

As described above, the power conversion device 100 according to the present embodiment 2 changes at least one of the primary-side DC voltage V1 and the secondary-side DC voltage V2, to relax a constraint condition relevant to a voltage and current ranges for achieving zero voltage switching operation, and thus can expand the operation region in which a solution of the optimization problem for minimizing the peak absolute value of the current itr1 can be obtained.

Embodiment 3

Figure 7:
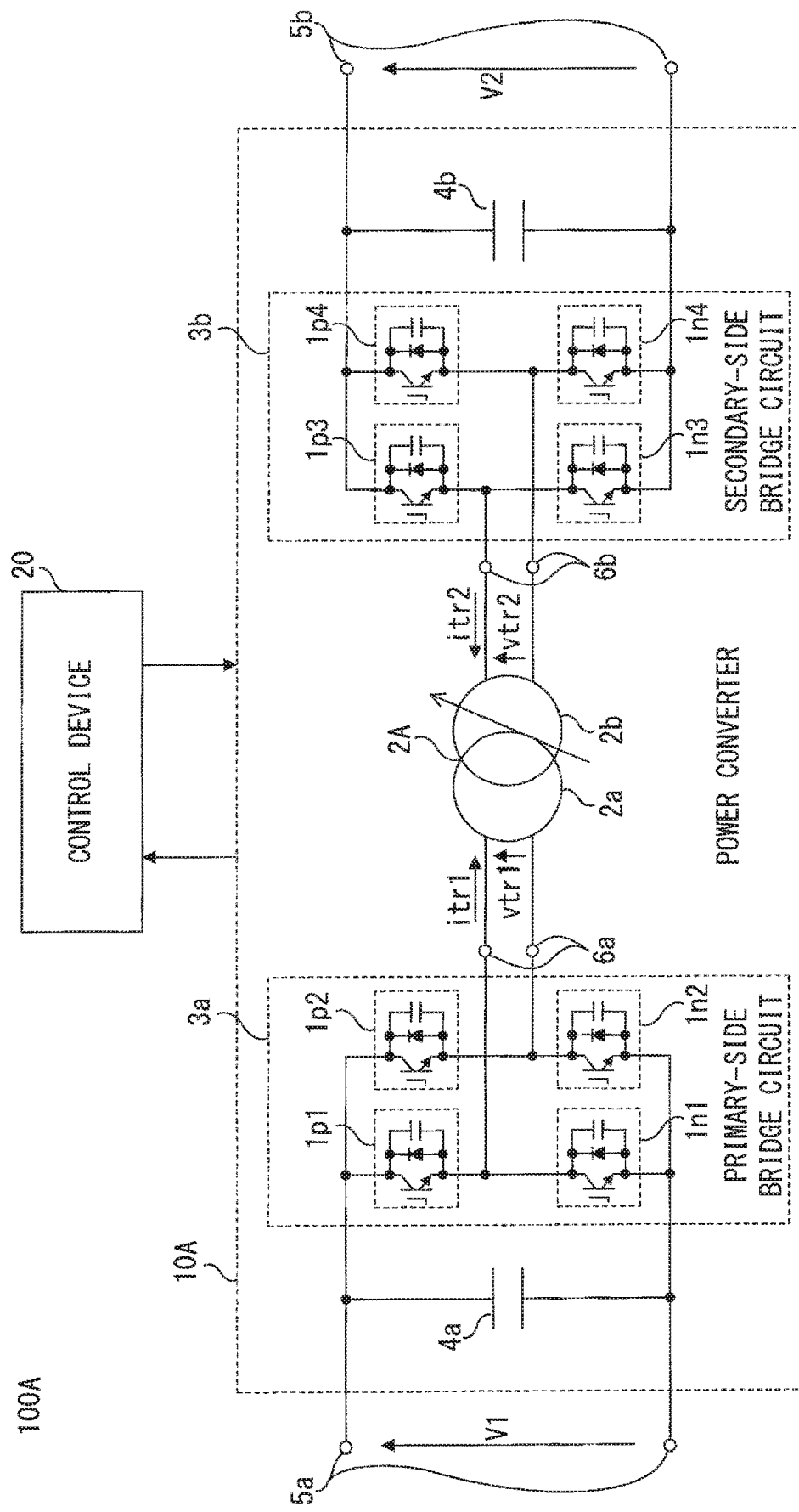
FIG. 7 is a diagram showing the configuration of a power conversion device 100A according to embodiment 3.

FIG. 7 is a diagram showing the configuration of a power conversion device 100A according to embodiment 3.

As in the above embodiment 2, the present embodiment 3 also aims to expand the operation region in which a solution of the optimization problem for minimizing the peak absolute value of the current itr1 can be obtained.

A difference from the above embodiment is that a loaded-case tap-changer-equipped transformer 2A is applied as a transformer for interconnection between both bridge circuits 3a, 3b, as shown in FIG. 7.

The loaded-case tap-changer-equipped transformer 2A changes the turns ratio Ntr of the transformer 2A on the basis of a command from the control device 20.

Thus, even in application in which the primary-side DC voltage V1 of the power converter 10A cannot be changed, it is possible to change the primary-side converted value of the secondary-side DC voltage V2 without changing the primary-side DC voltage V1 of the power converter 10A.

Therefore, as is also found from the above Expressions (10) and (11), by adjusting the turns ratio Ntr of the transformer 2A on the basis of a command value from the control device 20, the constraint condition can be substantially relaxed, as in the case described in the above embodiment 2, and even in such a condition in which an optimum solution of the optimization calculation cannot be found, zero voltage switching operation can be achieved in a wider operation region, without changing the primary-side DC voltage V1.

In FIG. 7, the case of employing the loaded-case tap-changer-equipped transformer 2A has been described. However, a transformer having a tap changeover function with no load may be employed for achieving zero voltage switching operation in a wider operation region.

Embodiment 4

Figure 8:
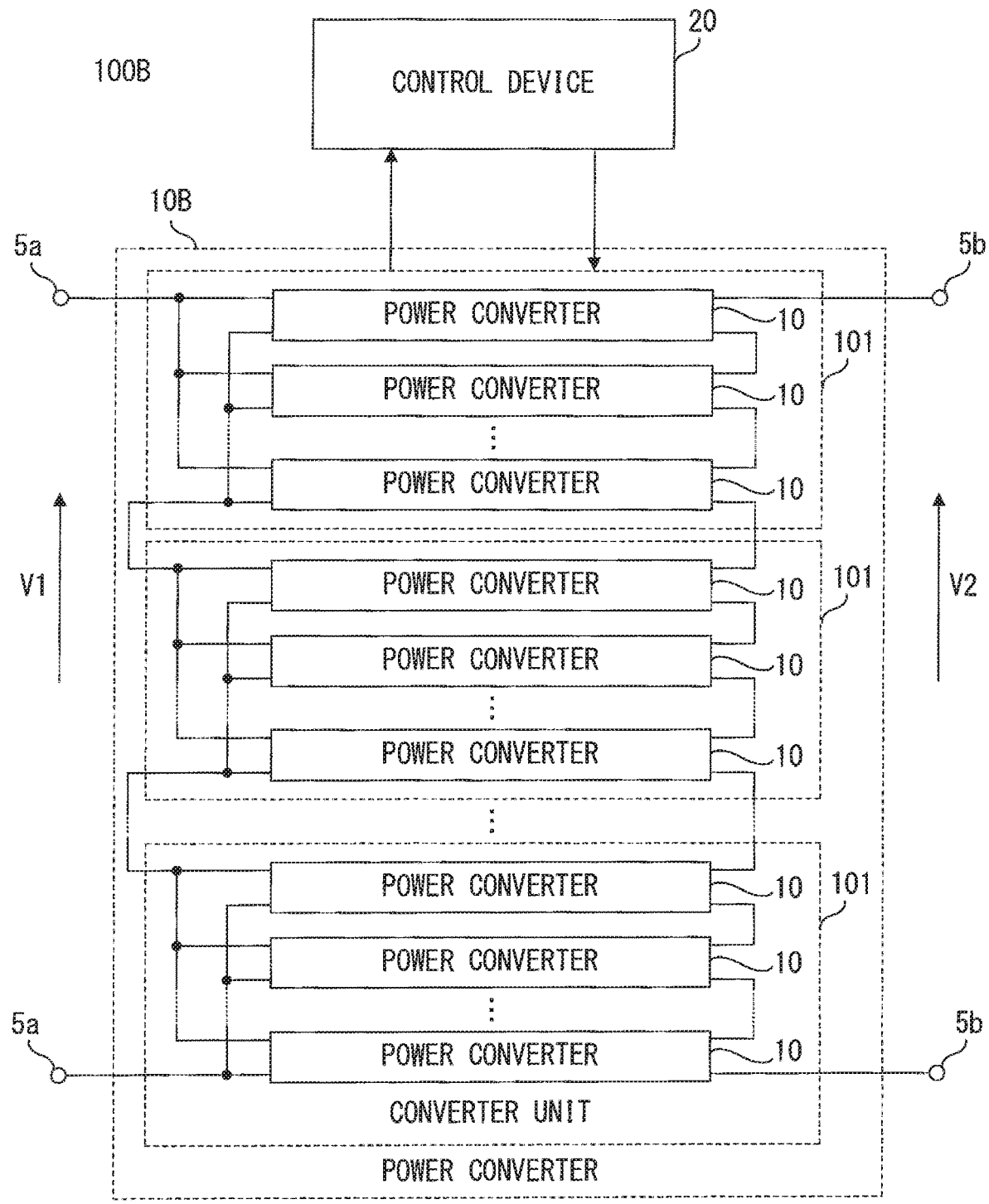
FIG. 8 is a diagram showing the configuration of a power conversion device 100B according to embodiment 4.

FIG. 8 is a diagram showing the configuration of a power conversion device 100B according to embodiment 4.

As in the above embodiments 2 and 3, the present embodiment 4 also aims to expand the operation region in which a solution of the optimization problem for minimizing the peak absolute value of the current itr1 can be obtained.

As shown in FIG. 8, a power converter 10B includes a plurality of converter cells each of which is the above power converter 10, the primary-side DC terminals of the plurality of converter cells are connected in parallel for at least one or more converter cells, and the secondary-side DC terminals thereof are connected in series, to form a converter unit 101 including a plurality of the converter cells.

Two or more such converter units 101 are provided, the primary-side DC terminals of the two or more converter units 101 are connected in series, and the secondary-side DC terminals thereof are connected in series, to form the power converter 10B. As a matter of course, the power converter 10B may be composed of one converter unit 101. The configuration in which the plurality of converters and converter units are connected in series or parallel is not limited to that shown in FIG. 8.

As described above, the power conversion device according to the present embodiment 4 includes the power converter B having a configuration in which the power converter is multiplexed with the plurality of power converters 10. Thus, even in the case where the primary-side DC voltage V1 and the secondary-side DC voltage V2 of the power conversion device 100B cannot be changed, it is possible to adjust or change one or both of the primary-side DC voltage and the secondary-side DC voltage of each power converter 10 by changing voltage allocations for the respective power converters 10. Accordingly, as in the case described in the above embodiment 2, the constraint condition can be substantially relaxed, and even in such a condition in which an optimum solution of the optimization calculation cannot be found, zero voltage switching operation can be achieved in a wider operation region.

Embodiment 5

Figure 9:
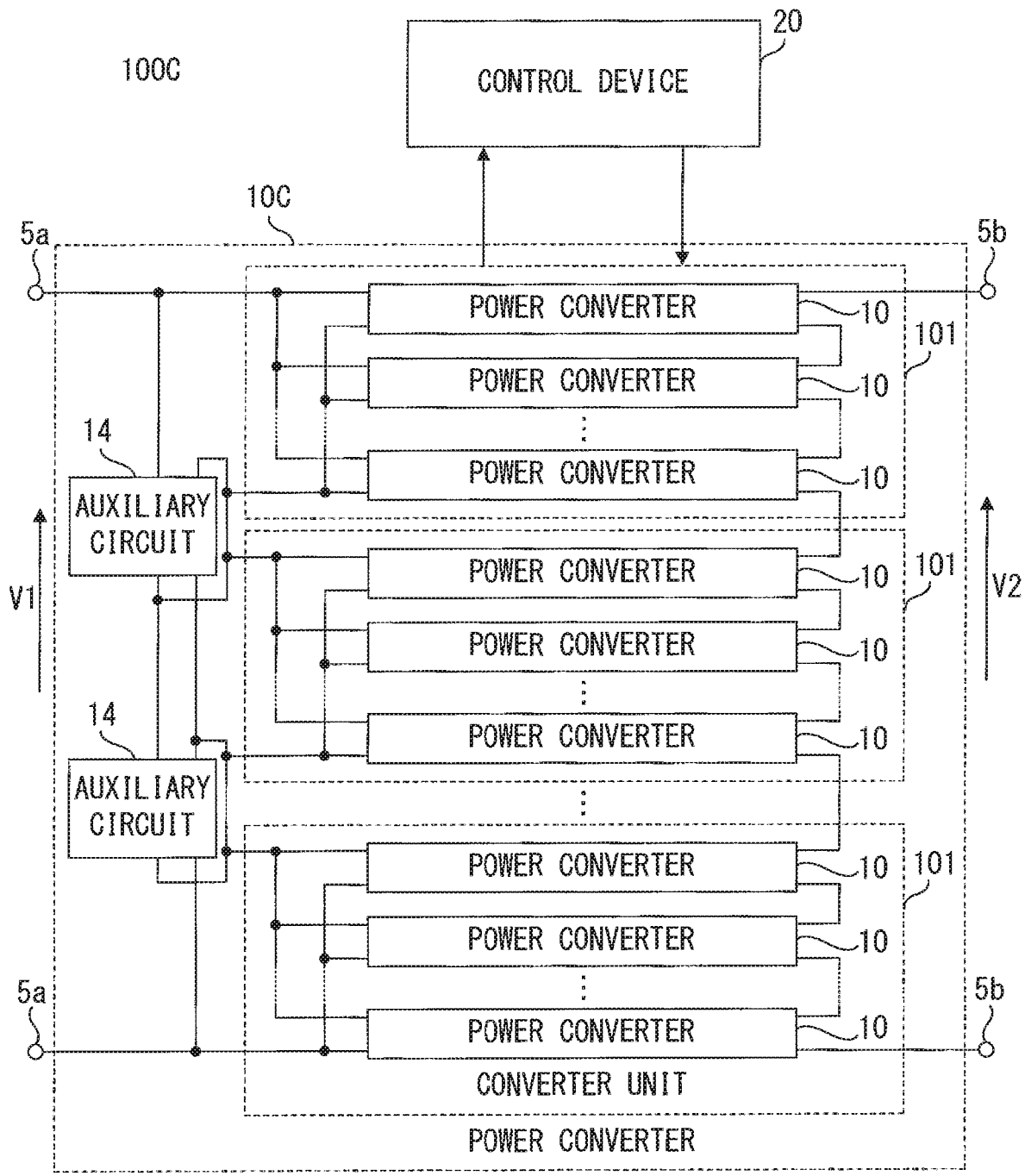
FIG. 9 is a diagram showing the configuration of a power conversion device 100C according to embodiment 5.

FIG. 9 is a diagram showing the configuration of a power conversion device 100C and a power converter 10C according to embodiment 5. A difference from the above embodiment 4 is that an auxiliary circuit 14 for performing power transfer between a plurality of power converters is newly provided.

That is, as shown in FIG. 9, an auxiliary circuit 14 for performing power transfer between the converter units 101 is provided, one terminal of the auxiliary circuit 14 is connected to the primary-side DC terminal of one converter unit 101, and another terminal of the auxiliary circuit 14 is connected to the primary-side DC terminal of another converter unit 101. Thus, power interchange between both converter units is performed via the auxiliary circuit 14, whereby the primary-side DC voltage of the converter units 101 can be adjusted or changed more finely.

The auxiliary circuit 14 may be provided on the secondary side instead of the primary side as shown in FIG. 9, or may be provided on both sides. The auxiliary circuit 14 may be provided so as to allow power transfer between the power converters 10.

As described above, in the power conversion device according to the present embodiment 5, the auxiliary circuit 14 for performing power transfer between the power converters is provided. Thus, even in the case where the primary-side DC voltage V1 and the secondary-side DC voltage V2 of the power conversion device 100C cannot be changed, it is possible to adjust or change one or both of the primary-side DC voltage and the secondary-side DC voltage of each power converter 10 by adjusting voltage allocations of the respective power converters 10 more finely. Accordingly, as in the case described in the above embodiment 2, the constraint condition can be substantially relaxed, and even in such a condition in which an optimum solution of the optimization calculation cannot be found, zero voltage switching operation can be achieved in a wider operation region.

Embodiment 6

Figure 10:
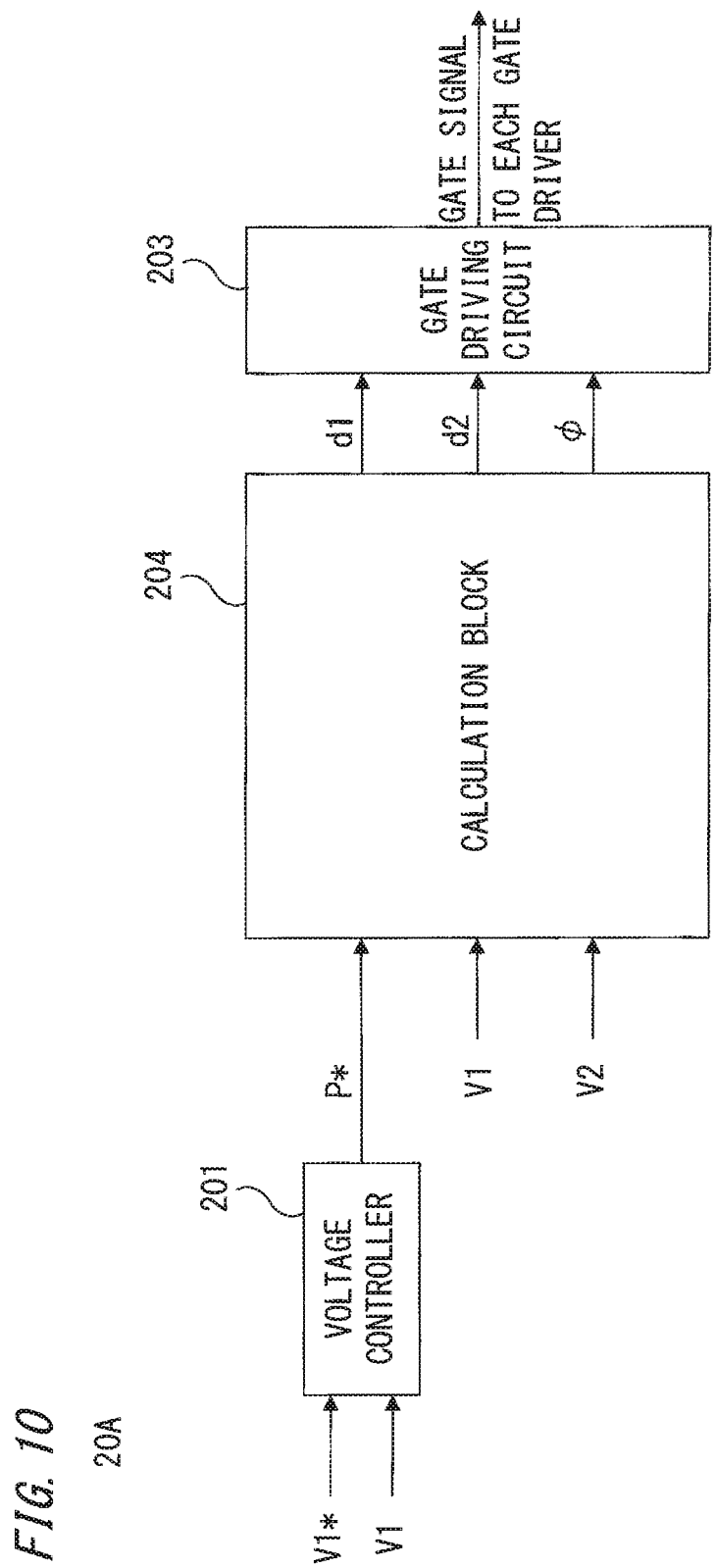
FIG. 10 is a diagram showing the internal configuration of a control device 20A according to embodiment 6.

FIG. 10 shows the internal configuration of a control device 20A according to embodiment 6. As described in FIG. 3, the control device 20 of the above embodiment 1 uses a solution of an optimization problem, and since the calculation for obtaining the solution is performed in a large scale and is complicated, output information including the primary-side duty d1, the secondary-side duty d2, and the phase shift amount φ with respect to input information about the operation point composed of the transmission power command value P*, the primary-side DC voltage V1, and the secondary-side DC voltage V2 is calculated in a range of assumed operation points in advance, and the look up table 202 that stores the calculated output information is provided.

The look up table 202 reads the primary-side duty d1, the secondary-side duty d2, and the phase shift amount φ corresponding the transmission power command value P*, the primary-side DC voltage V1, and the secondary-side DC voltage V2 from the voltage controller 201, and outputs the read values to the gate driving circuit 203.

Therefore, for the look up table 202, it is necessary to prepare a large-scale memory area.

The control device 20A according to the present embodiment 6 is for eliminating the problem of increase in the memory area in the method using a solution of an optimization problem as described above, and is configured to, through calculation for each time, output information including the primary-side duty d1, the secondary-side duty d2, and the phase shift amount φ as required, with respect to information about the operation point composed of the transmission power command value P*, the primary-side DC voltage V1, and the secondary-side DC voltage V2 that are inputted. Thus, the look up table 202 that requires a large-scale memory area is unnecessary, so that the control device can be downsized.

As shown in FIG. 10, the control device 20A according to embodiment 6 includes a calculation block 204 instead of the look up table 202 of embodiment 1. Hereinafter, the configuration and function of the calculation block 204 will be described in detail.

Here, the description will be given on the basis of the circuit configuration described in FIG. 1 in the above embodiment 1 and the switching pattern exemplified in FIG. 5.

In the calculation block 204, first, in order that a solution can be obtained through calculation for each time, it is assumed that resonant current flowing through the snubber capacitor during a resonance phenomenon between the snubber capacitor and the inductance as described in FIG. 6 above is constant without changing temporally.

In the description in the above embodiments, the inductance is the leakage inductance Lσ of the transformer 2 (2A). However, the inductance may not necessarily be the leakage inductance of the transformer 2 (2A), and an additional inductance may be connected so as to be added thereto. Further, if the primary side and the secondary side need not be isolated from each other, the primary-side AC terminals 6a and the secondary-side AC terminals 6b may be connected via only an inductance element corresponding to the leakage inductance, without using the transformer 2 (2A).

Therefore, in the present embodiment 6, the inductance is shown as an inductance element L.

By providing the above assumption, as will be described below, treatment as in a DC circuit manner becomes possible, and using linear and comparatively simple calculation formulas, the current value at each switching timing is obtained for an indicated operation point through calculation for each time, and from the calculated value information, information including the primary-side duty d1, the secondary-side duty d2, and the phase shift amount φ as required can be obtained.

Regarding a measure for compensating error against a calculation result in which change in resonant current is taken into consideration as an actual phenomenon, due to the above provided assumption, description will be given at a later stage.

Here, the summary of the configuration and function of the calculation block 204 will be shown below. That is, on the above assumption, under the condition specified by the operation point (P*, V1, V2), the minimum absolute value of current at the switching timing of each switching element is calculated so as to satisfy a first conditional expression needed for achieving zero voltage switching operation. Further, the value of current at each switching timing is calculated so as to satisfy a second conditional expression for achieving the transmission power (P*) specified by the operation point.

Then, required information (d1, d2, φ) is outputted on the basis of the value of current at each switching timing that satisfies both of the first conditional expression and the second conditional expression described above.

Expressions (12) to (16) represent the first conditional expressions.

[Mathematical 5]

$$i_{tr1}(0) \leq -I_{prim-min} \quad (12)$$

$$i_{tr1}(\alpha) \leq -I_{prim-min} \quad (13)$$

$$i_{tr1}(\beta) \geq N_{tr} \times I_{sec-min} \quad (14)$$

$$i_{tr1}(\gamma) \leq -N_{tr} \times I_{sec-min} \quad (15)$$

$$I_{\{prim,sec\}-com} = \max\left\{ \frac{V_{\{prim,sec\}}}{\sqrt{\frac{L}{2C_s}}}, \frac{2C_s}{t_d} V_{\{prim,sec\}} \right\} \quad (16)$$

Here, the current values at four switching timings of θ=0, α, β, γ will be discussed in consideration of symmetry of control as described in FIG. 5 above.

Left-hand-side terms itr1(0) and itr1(α) in Expressions (12) and (13) are the primary-side current values of the transformer 2 at θ=0 and α, respectively. In a right-hand-side term "Iprim-min" of the expressions, the greater one of the first and second terms on the right-hand side of Expression (16) which will be described later in detail, is substituted.

It is noted that, in Expression (16), a suffix (prim, sec) is used so that the expression can be shared by Expressions (12), (13) regarding Iprim, Vprim on the primary side, and Expressions (14), (15) regarding Isec, Vsec on the secondary side.

Use of lower-case letter "i" for current on the left-hand side in the expressions is relevant to treatment of a sequential signal, and use of capital letter "I" for current on the right-hand side in the expressions is relevant to treatment of a signal of a fixed value corresponding to the constraint condition.

After all, Expressions (12) and (13) represent a condition that the primary-side current (itr1(0), itr1(α)) at each switching timing indicated on the left-hand side is equal to or greater than the absolute value (Iprim-min) of current indicated on the right-hand side, as is found from the inequality signs and positive/negative signs in the expressions.

Similarly, left-hand-side terms itr1(β) and itr1(γ) in Expressions (14) and (15) are primary-side converted values of the secondary-side current of the transformer 2 at θ=β and γ, respectively. In a right-hand-side term "Isec-min" of the expressions, the greater one of the first and second terms on the right-hand side of Expression (16) is substituted.

As in the above Expressions (12) and (13), Expressions (14) and (15) represent a condition that the secondary-side current primary-side converted value (itr1(β), itr1(γ)) at each switching timing indicated on the left-hand side is equal to or greater than the absolute value (Ntr×Isec-min) of current indicated on the right-hand side, as is found from the inequality signs and positive/negative signs in the expressions.

Next, the details of Expression (16) and the ground for deriving Expression (16) will be described. It is noted that the left-hand side of Expression (16) uses the expression (I(prim, sec)-com) with the intent of allowing sharing among the expressions.

First, the first term on the right-hand side of Expression (16) is derived from a condition that energy accumulated in the inductance element L is equal to or greater than energy accumulated in the snubber capacitor Cs, which is a necessary condition for achieving zero voltage switching operation.

Specifically, in the case of operation of the circuit shown in FIG. 1, when the period of dead time td is entered, by energy accumulated in the inductance element L, the snubber capacitor Cs in a charged state on the semiconductor switching element 1p1 side is discharged and at the same time, the snubber capacitor Cs in a discharged state on the semiconductor switching element 1n1 side is charged. Therefore, the above condition is represented by the following Expression (17), and the first term on the right-hand side of Expression (16) is derived from the Expression (17).

[Mathematical 6]

$$\tfrac{1}{2} \times L \times I^2 \geq \tfrac{1}{2} \times 2C_s \times V \times I^2 \quad (17)$$

Next, the second term on the right-hand side of Expression (16) is derived from a condition that energy (electric charge) accumulated in the snubber capacitor Cs is completely transferred during the dead time td, which is also a necessary condition for achieving zero voltage switching operation.

Figure 11:
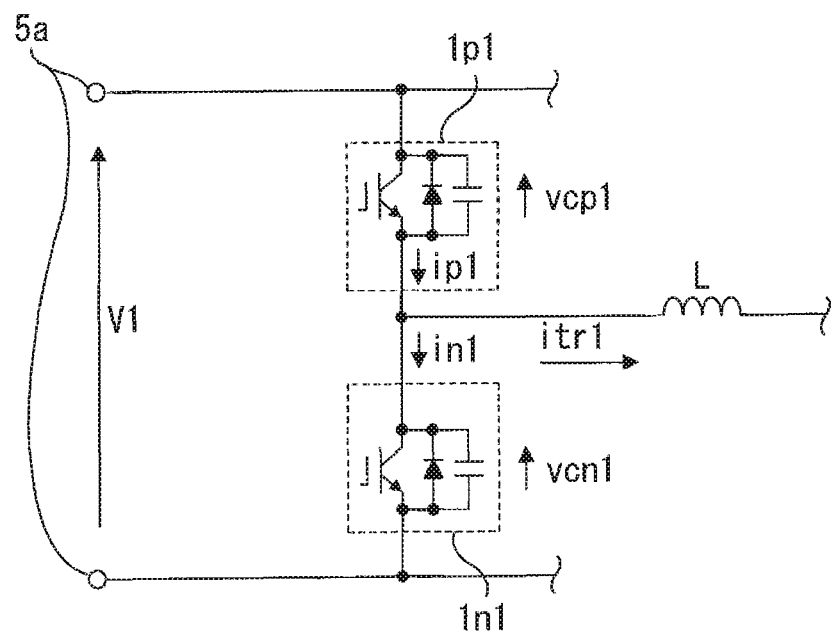
FIG. 11 shows a part of the configuration shown in FIG. 1, for illustrating operation according to embodiment 6.

Specifically, with reference to the circuit shown in FIG. 1 as an example, the ground for deriving the second term on the right-hand side of Expression (16) will be described below. FIG. 11 shows only a part needed for the following description, in the configuration shown in FIG. 1.

In FIG. 11, V1 is the primary-side DC voltage, $i_{p1}$ and $i_{n1}$ are respective currents flowing through the semiconductor switching elements $1p1$ and $1n1$ in directions indicated by arrows, $i_{tr1}$ is current flowing through the inductance element L, and $v_{cp1}$ and $v_{cn1}$ are respective voltages of the snubber capacitors Cs of the semiconductor switching elements $1p1$ and $1n1$. In this case, the following Expressions (18) and (19) are satisfied.

[Mathematical 7]

$$i_{p1} = i_{n1} = i_{tr1} \quad (18)$$

$$v_{cp1} + v_{cn1} = V_1 \quad (19)$$

Voltage-current equations regarding the snubber capacitors Cs of the semiconductor switching elements $1p1$ and $1n1$ are represented by the following Expressions (20) and (21).

[Mathematical 8]

$$i_{p1} = C_s \frac{dv_{cp1}}{dt} \quad (20)$$

$$i_{n1} = C_s \frac{dv_{cn1}}{dt} \quad (21)$$

By substituting Expressions (18) and (19) into Expression (21) so as to delete in1 and vcn1, and further, substituting Expression (20) and arranging the expressions, the following Expressions (22) and (23) are obtained.

[Mathematical 9]

$$i_{p1} - i_{tr1} = -C_s \frac{d}{dt} v_{cp1} = -i_{p1} \quad (22)$$

$$i_{p1} = \frac{1}{2} i_{tr1} = -i_{n1} \quad (23)$$

From the above, it is found that symmetric currents flow through the upper and lower elements $1p1$ and $1n1$.

Here, from the initial state of vcp1=V1 and vcn1=0, transfer of electric charge is completed during the dead time td, and then the state shifts to a state of vcp1=0 and vcn1=V1. Therefore, a condition imposed on the primary-side current itr1 is represented by Expression (24), and from the Expression (24), the second term on the right-hand side of Expression (16) is obtained as shown by Expression (25).

[Mathematical 10]

$$\frac{1}{2} i_{tr1} \leq C_s \frac{dv_{cp1}}{dt} = -C_s \frac{V_1}{t_d} \quad (24)$$

$$i_{tr1} \leq -\frac{2 C_s V_1}{t_d} = -I_{prim-min} \quad (25)$$

Also in the case of shifting from the initial state of vcp1=0 and vcn1=V1 to the state of vcp1=V1 and vcn1=0, the expressions can be obtained in a similar manner.

The first conditional expressions described above are a necessary condition for achieving zero voltage switching operation. Next, the second conditional expression necessary for achieving the transmission power (P*) specified by the operation point will be described.

As described above, here, operation in the switching pattern shown in FIG. 5 above is targeted, and therefore, as in the case described in Expression (11) of the above embodiment 2, the power (P*, here, denoted by P in accordance with indication in Expression (11)) P transmitted from the primary side to the secondary side is determined by the transmission power from the switching timing $\theta=\beta$ to the switching timing $\theta=\gamma$, and is represented by Expression (26).

[Mathematical 11]

$$\frac{1}{\omega} \int_{\beta}^{\gamma} i_{tr1}(\theta) \times V_1 d\theta = \frac{T}{2} \times P \quad (26)$$

Here, T is a switching cycle (T=1/f), and $\omega$ is an angular frequency ($\omega=2\pi f$).

An equation regarding current over a period of $\theta=\beta$ to $\gamma$ is represented by Expression (27). By substituting Expression (27) into Expression (26), Expression (28) is obtained.

[Mathematical 12]

$$i_{tr1}(\theta) = i_{tr1}(\beta) + \frac{1}{L}(V_1 - V_2/N_{tr}) \times \frac{\theta - \beta}{\omega} \quad (27)$$

$$\frac{T}{2} \times P = \quad (28)$$

$$\frac{1}{\omega}\int_{\beta}^{\gamma} i_{tr1}(\theta) \times V_1 d\theta = \frac{1}{\omega} V_1 \times \left[ \begin{array}{c} i_{tr1}(\beta) \times \theta - \frac{1}{L}(V_1 - V_2/N_{tr}) \times \\ \frac{\beta\theta}{\omega} + \frac{1}{2} \times \frac{1}{L}(V_1 - V_2/N_{tr})\frac{\theta^2}{\omega} \end{array} \right]_{\beta}^{\gamma} =$$

$$\frac{V_1}{\omega} \times \left[ i_{tr1}(\beta) \times \theta + \frac{1}{2} \times \frac{1}{\omega L}(V_1 - V_2/N_{tr}) \times (\theta^2 - 2\beta\theta) \right]_{\beta}^{\gamma} =$$

$$\frac{V_1}{\omega} \times \left\{ i_{tr1}(\beta) \times (\gamma - \beta) + \frac{1}{2} \times \frac{1}{\omega L}(V_1 - V_2/N_{tr}) \times (\gamma - \beta)^2 \right\} =$$

$$\frac{1}{2} \times \frac{V_1}{\omega} \times (\gamma - \beta) \times \left\{ 2 i_{tr1}(\beta) + \frac{1}{\omega L}(V_1 - V_2/N_{tr}) \times (\gamma - \beta) \right\}$$

In order to delete $(\gamma - \beta)$ from Expression (28) so as to obtain a relational expression for current, Expression (29) and Expression (30) are substituted into Expression (28), whereby Expression (31) is obtained.

[Mathematical 13]

$$i_{tr1}(\gamma) = i_{tr1}(\beta) + \frac{1}{L}(V_1 - V_2/N_{tr}) \times \frac{\gamma - \beta}{\omega} \quad (29)$$

$$(\gamma - \beta) = \frac{(i_{tr1}(\gamma) - i_{tr1}(\beta))}{\frac{1}{\omega L}(V_1 - V_2/N_{tr})} \quad (30)$$

$$\frac{1}{\omega}\int_{\beta}^{\gamma} i_{tr1}(\theta) \times V_1 d\theta = \quad (31)$$

$$\frac{1}{2} \times \frac{V_1}{\omega} \times \frac{(i_{tr1}(\gamma) - i_{tr1}(\beta))}{\frac{1}{\omega L}(V_1 - V_2/N_{tr})} \times (i_{tr1}(\beta) + i_{tr1}(\gamma)) =$$

$$\frac{1}{2} \times V_1 \times \frac{(i_{tr1}^2(\gamma) - i_{tr1}^2(\beta))}{\frac{1}{L}(V_1 - V_2/N_{tr})} = \frac{T}{2} \times P$$

Finally, Expression (31) is arranged for itr1(β), to obtain Expression (32).

[Mathematical 14]

$$i_{tr1}(\beta) = \sqrt{i_{tr1}^2(\gamma) + \frac{(V_2/N_{tr} - V_1)}{LV_1} \times T \times P} \qquad (32)$$

Expression (32) is the second conditional expression for this case (switching pattern shown in FIG. 5), i.e., a condition necessary for achieving the transmission power (P*) specified by the operation point.

Therefore, the current itr1(β) needs to satisfy both conditions of Expression (14) as the first conditional expression and Expression (32) as the second conditional expression.

Then, the minimum values that satisfy Expressions (12), (13), and (15) which are the first conditional expressions are applied to the currents itr1(0), itr1(α), and itr1(γ), and if the current itr1(β) calculated from Expression (32) which is the second conditional expression when the current itr1(γ) is substituted therein satisfies the Expression (14) which is the first conditional expression, these four current values are determined.

If the value of the current itr1(β) calculated first does not satisfy Expression (14), the current itr1(γ) is changed within a range that satisfies Expression (15) which is the first conditional expression, and thus the calculation is pursued so that the current itr1(β) obtained by substituting the changed current itr1(γ) into Expression (32) which is the second conditional expression satisfies Expression (14) which is the first conditional expression.

Next, the manner for calculating the primary-side duty d1, the secondary-side duty d2, and the phase shift amount c to be outputted finally, from the currents itr1(0), itr1(α), itr1(β), itr1(γ) at the switching timings θ=0, α, β, γ calculated as described above, will be described.

First, with reference to FIG. 5 above, the relationship of voltage=ωL×(ditr1(t)/dt) is applied thereto, whereby relational expressions shown by the following Expressions (33), (34), (35) are obtained.

[Mathematical 15]

$$\alpha = \beta - \omega L \frac{i_{tr1}(\beta) - i_{tr1}(\alpha)}{V_1} \qquad (33)$$

$$\beta = \gamma - \omega L \frac{i_{tr1}(\gamma) - i_{tr1}(\beta)}{V_1 - V_2/N_{tr}} \qquad (34)$$

$$\gamma = \pi - \omega L \frac{i_{tr1}(\pi) - i_{tr1}(\gamma)}{V_1} = \pi - \omega L \frac{-i_{tr1}(0) - i_{tr1}(\gamma)}{V_1} \qquad (35)$$

From these expressions, the switching timings θ=α, β, γ are calculated, and when the switching timings θ=α, β, γ are determined, the values of the primary-side duty d1, the secondary-side duty d2, and the phase shift amount φ to be outputted finally are uniquely determined from the above values.

As described above, the control device 20A according to the present embodiment 6 is provided with the calculation block 204 in which a predetermined assumption is set for a resonance phenomenon and which outputs information including the primary-side duty d1, the secondary-side duty d2, and the phase shift amount φ as required, through calculation for each time, with respect to information about the operation point composed of the transmission power command value P*, the primary-side DC voltage V1, and the secondary-side DC voltage V2 that are inputted. Thus, the look up table 202 that requires a large-scale memory area is unnecessary, so that the control device can be downsized.

As described above, in the calculation block 204, in order that a solution can be obtained through calculation for each time, it is assumed that resonant current flowing through the snubber capacitor during a resonance phenomenon between the snubber capacitor and the inductance element is constant without changing temporally, whereby the primary-side duty d1, the secondary-side duty d2, and the phase shift amount φ are calculated.

Therefore, due to the provided assumption, as a matter of course, error occurs against a result calculated on the basis of an actual phenomenon accompanied with change in resonant current as described in the above embodiment 1. Hereinafter, a measure for compensating this error will be described.

Here, a plurality of representative operation points are set in consideration of the entire control target region, and under the condition specified by each of these set operation points, first, current values (hereinafter, referred to as real current calculation values) are calculated in the manner described in the above embodiment 1, i.e., using a solution of the optimization problem on the basis of an actual resonance phenomenon in its original way, and next, current values (hereinafter, referred to as approximated current calculation values) are calculated on the basis of the first conditional expressions described in the present embodiment 6.

In comparison between the magnitudes of the real current calculation value and the approximated current calculation value at each operation point, both are generally close to each other at any of the operation points. Accordingly, Expression (16) which is the first conditional expression described above is multiplied by a constant correction coefficient a calculated by applying, for example, a least squares method so that a deviation between both values is minimized, whereby Expression (36) as a third conditional expression is obtained.

[Mathematical 16]

$$I_{\{prim,sec\}-com} = a_{\{prim,sec\}} \times \max\left\{\frac{V_{\{prim,sec\}}}{\sqrt{\frac{L}{2C_s}}}, \frac{2C_s}{t_d}V_{\{prim,sec\}}\right\} \qquad (36)$$

Thus, by applying Expression (36) which is the third conditional expression instead of Expression (16) which is the first conditional expression, it becomes possible to obtain a power conversion device that can ensure almost the same accuracy as in the method using a solution of an optimization problem in the above embodiment 1, and that enables size reduction of the control device.

It is noted that the methods for expanding the operation region as described in the above embodiments 2 to 5 are effective also for the case of the present embodiment 6. That is, in the case where it is impossible to satisfy the primary-side minimum current and the secondary-side minimum current merely by controlling the primary-side duty d1, the secondary-side duty d2, and the phase shift amount φ, one or both of the primary-side DC voltage V1 and the secondary-side DC voltage V2 are adjusted or changed, whereby the constraint condition can be substantially relaxed, and thus zero voltage switching operation can be achieved in a wider operation region.

In the above embodiments 1 to 6, silicon is normally used for the switching elements 11 and the (freewheeling) diodes 12. However, a wide bandgap material such as silicon carbide, gallium-nitride-based material, or diamond which has a greater bandgap than silicon may be used. Using such a wide bandgap material as the semiconductor material enables increase in the withstand voltage of the semiconductors and loss reduction thereof.

In the present disclosure, in particular, operation that minimizes loss in the power converter 10 on the premise that zero voltage switching operation is performed is pursued. Therefore, as the loss, conduction loss is dominant. Accordingly, it is expected that using a wide bandgap material as the semiconductor material greatly contributes to the overall loss reduction.

Further, the switching speed can be increased. Therefore, by increasing the frequency of AC voltage, the transformer 2 (2A) can be downsized and loss therein is also reduced.

For the iron core material of the transformer 2 (2A), normally, silicon steel is used. However, an amorphous (non-crystalline) material having a smaller sheet thickness than silicon steel may be used. Using an amorphous material enables further reduction in loss.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1$p$1 to 1$n$4 semiconductor switching element
2, 2A transformer
3$a$ primary-side bridge circuit
3$b$ secondary-side bridge circuit
4$a$, 4$b$ capacitor
5$a$ primary-side DC terminal
5$b$ secondary-side DC terminal
6$a$ primary-side AC terminal
6$b$ secondary-side AC terminal
10, 10A, 10B, 10C power converter
11 switching element
12 diode
13 snubber capacitor
14 auxiliary circuit
20, 20A control device
100, 100A, 100B, 100C power conversion device
201 voltage controller
202 look up table
203 gate driving circuit
204 calculation block
V1 primary-side DC voltage
V2 secondary-side DC voltage
V1* primary-side DC voltage command value
P* transmission power command value
d1 primary-side duty
d2 secondary-side duty
φ phase shift amount

The invention claimed is:

1. A power conversion device comprising a power converter for performing power conversion between primary-side DC voltage and secondary-side DC voltage, and a control device for controlling the power converter in accordance with a command value, wherein
the power converter includes
a primary-side bridge circuit which includes a first switching element and a first snubber capacitor connected in parallel to the first switching element, and which is connected between a primary-side DC terminal and a primary-side AC terminal, the primary-side bridge circuit being configured to perform DC/AC conversion, and
a secondary-side bridge circuit which includes a second switching element and a second snubber capacitor connected in parallel to the second switching element, and which is connected between a secondary-side DC terminal and a secondary-side AC terminal connected to the primary-side AC terminal via an inductance element, the secondary-side bridge circuit being configured to perform AC/DC conversion,
the power converter is configured so as to allow zero voltage switching operation using a resonance phenomenon between each of the first and second snubber capacitors and the inductance element,
voltage of the primary-side DC terminal of the power converter, voltage of the secondary-side DC terminal thereof, and one of the command value and a detection value of transmission power transmitted via the inductance element are prescribed as an operation point, and
the control device generates a primary-side duty for the primary-side bridge circuit, a secondary-side duty for the secondary-side bridge circuit, and a phase shift amount between the primary-side bridge circuit and the secondary-side bridge circuit, so that an absolute value of current flowing through the inductance element is minimized at a switching timing of each switching element in the primary-side bridge circuit and the secondary-side bridge circuit, under a condition that the zero voltage switching operation is achieved and that transfer of accumulated energy in the first and second snubber capacitors is completed within a dead time period from the switching timing of each switching element and each of currents flowing through the primary-side bridge circuit and the secondary-side bridge circuit is not inverted, at the operation point.

2. The power conversion device according to claim 1, further comprising a look up table in which the operation point is associated with the primary-side duty, the secondary-side duty, and the phase shift amount in advance, wherein
the control device reads the primary-side duty, the secondary-side duty, and the phase shift amount corresponding to the operation point, from the look up table.

3. The power conversion device according to claim 2, wherein
the look up table is configured such that the primary-side duty, the secondary-side duty, and the phase shift amount corresponding to each operation point are generated on the basis of a solution of an optimization problem for minimizing a peak absolute value of current flowing through the inductance element, using voltage and current ranges in which the zero voltage switching operation is achieved, as a constraint condition.

4. The power conversion device according to claim 1, wherein
the inductance element is a transformer including a primary-side winding connected to the primary-side AC terminal of the power converter, and a secondary-side winding connected to the secondary-side AC terminal of the power converter.

5. The power conversion device according to claim 4, wherein
the transformer has a tap changeover function capable of changing a turns ratio between the primary-side winding and the secondary-side winding, and
an operation region in which the zero voltage switching operation is achieved and loss in the power converter can be minimized is enlarged, by changing the turns ratio so as to relax a constraint condition regarding voltage and current ranges for achieving the zero voltage switching operation.

6. The power conversion device according to claim 1, wherein
an operation region in which the zero voltage switching operation is achieved and loss in the power converter can be minimized is enlarged, by changing at least one of voltage of the primary-side DC terminal and voltage of the secondary-side DC terminal of the power converter so as to relax a constraint condition regarding voltage and current ranges for achieving the zero voltage switching operation.

7. The power conversion device according to claim 6, wherein
the power converter comprises a plurality of power converters, and
the primary-side DC terminals of the power converters are connected in series or parallel so as to be connected to a terminal for the primary-side DC voltage of the power conversion device, and the secondary-side DC terminals of the power converters are connected in series or parallel so as to be connected to a terminal for the secondary-side DC voltage of the power conversion device, thus arranging the power conversion device in accordance with a configuration in which the plurality of power converters are provided, so that at least one of voltage of the primary-side DC terminal and voltage of the secondary-side DC terminal of the power converter is changeable without changing the primary-side DC voltage and the secondary-side DC voltage.

8. The power conversion device according to claim 7, further comprising an auxiliary circuit for performing power transfer between the plurality of the power converters of which the primary-side DC terminals or the secondary-side DC terminals are connected in series to each other, so that voltages of the primary-side DC terminals or voltages of the secondary-side DC terminals of the plurality of the power converters are changeable without changing the primary-side DC voltage and the secondary-side DC voltage.

9. The power conversion device according to claim 1, wherein
the control device generates the primary-side duty for the primary-side bridge circuit, the secondary-side duty for the secondary-side bridge circuit, and the phase shift amount between the primary-side bridge circuit and the secondary-side bridge circuit, so as to minimize an evaluation function which is obtained by adding absolute values of currents flowing through the inductance element at the switching timings of the switching elements in the primary-side bridge circuit and the secondary-side bridge circuit, under the condition that the zero voltage switching operation is achieved, at the operation point.

10. The power conversion device according to claim 1, wherein
the control device generates the primary-side duty for the primary-side bridge circuit, the secondary-side duty for the secondary-side bridge circuit, and the phase shift amount between the primary-side bridge circuit and the secondary-side bridge circuit, so as to minimize an evaluation function which is obtained by weighting absolute values of currents flowing through the inductance element at the switching timings of the switching elements in the primary-side bridge circuit and the secondary-side bridge circuit on the basis of a degree of contribution to loss in the power conversion device and then adding the weighted absolute values, under the condition that the zero voltage switching operation is achieved, at the operation point.

11. A power conversion device comprising a power converter for performing power conversion between primary-side DC voltage and secondary-side DC voltage, and a control device for controlling the power converter in accordance with a command value, wherein
the power converter includes
a primary-side bridge circuit which includes a first switching element and a first snubber capacitor connected in parallel to the first switching element, and which is connected between a primary-side DC terminal and a primary-side AC terminal, the primary-side bridge circuit being configured to perform DC/AC conversion, and
a secondary-side bridge circuit which includes a second switching element and a second snubber capacitor connected in parallel to the second switching element, and which is connected between a secondary-side DC terminal and a secondary-side AC terminal connected to the primary-side AC terminal via an inductance element, the secondary-side bridge circuit being configured to perform AC/DC conversion,
the power converter is configured so as to allow zero voltage switching operation using a resonance phenomenon between each of the first and second snubber capacitors and the inductance element,
voltage of the primary-side DC terminal of the power converter, voltage of the secondary-side DC terminal thereof, and the command value or a detection value of transmission power transmitted via the inductance element are prescribed as an operation point,
on an assumption that resonant current flowing through at least one of the first and second snubber capacitors during the resonance phenomenon between the first and second snubber capacitors and the inductance element does not change temporally, the control device calculates a minimum absolute value of current at a switching timing of each switching element so as to satisfy a first conditional expression necessary for achieving the zero voltage switching operation, under a condition specified by the operation point, and calculates a current value at the switching timing of each switching element so as to satisfy a second conditional expression for achieving the command value or the detection value of the transmission power specified by the operation point, and the control device generates the primary-side duty for the primary-side bride circuit, the secondary-side duty for the secondary-side bridge circuit, and the phase shift amount between the primary-side bridge circuit and the secondary-side bridge circuit on the basis of a current value, at the switching timing of each switching element, that satisfies both of the first conditional expression and the second conditional expression.

12. The power conversion device according to claim 5, wherein
the first conditional expression is a calculation expression obtained on the basis of a condition that energy accumulated in the inductance element is equal to or greater than energy accumulated in at least one of the first and second snubber capacitor and that the energy accumulated in the at least one of the first and second snubber capacitor is all transferred during a dead time period from the switching timing.

13. The power conversion device according to claim 11, wherein
the inductance element is a transformer including a primary-side winding connected to the primary-side AC terminal of the power converter, and a secondary-side winding connected to the secondary-side AC terminal of the power converter.

14. The power conversion device according to claim 13, wherein
the transformer has a tap changeover function capable of changing a turns ratio between the primary-side winding and the secondary-side winding, and
an operation region in which the zero voltage switching operation is achieved and loss in the power converter can be minimized is enlarged, by changing the turns ratio so as to relax a constraint condition regarding voltage and current ranges for achieving the zero voltage switching operation.

15. The power conversion device according to claim 11, wherein
an operation region in which the zero voltage switching operation is achieved and loss in the power converter can be minimized is enlarged, by changing at least one of voltage of the primary-side DC terminal and voltage of the secondary-side DC terminal of the power converter so as to relax a constraint condition regarding voltage and current ranges for achieving the zero voltage switching operation.

16. The power conversion device according to claim 15, wherein
the power converter comprises a plurality of power converters, and
the primary-side DC terminals of the power converters are connected in series or parallel so as to be connected to a terminal for the primary-side DC voltage of the power conversion device, and the secondary-side DC terminals of the power converters are connected in series or parallel so as to be connected to a terminal for the secondary-side DC voltage of the power conversion device, thus arranging the power conversion device in accordance with a configuration in which the plurality of power converters are provided, so that at least one of voltage of the primary-side DC terminal and voltage of the secondary-side DC terminal of the power converter is changeable without changing the primary-side DC voltage and the secondary-side DC voltage.

17. The power conversion device according to claim 16, further comprising an auxiliary circuit for performing power transfer between the plurality of the power converters of which the primary-side DC terminals or the secondary-side DC terminals are connected in series to each other, so that voltages of the primary-side DC terminals or voltages of the secondary-side DC terminals of the plurality of the power converters are changeable without changing the primary-side DC voltage and the secondary-side DC voltage.

* * * * *